US005246806A

United States Patent [19]

Koyama et al.

[11] Patent Number: 5,246,806

[45] Date of Patent: Sep. 21, 1993

[54] ELECTROPHOTOGRAPHIC PHOTOSENSITIVE MEMBER AND APPARATUS USING SAME

[75] Inventors: Takashi Koyama; Naoto Fujimura, both of Yokohama; Yuichi Hashimoto, Tokyo; Tetsuo Shiraiwa, Ikoma; Shigeo Mori, Kyoto, all of Japan

[73] Assignee: Canon Kabushiki Kaisha, Tokyo, Japan

[21] Appl. No.: 803,606

[22] Filed: Dec. 9, 1991

[30] Foreign Application Priority Data

Dec. 7, 1990 [JP] Japan .................................. 2-407350

[51] Int. Cl.$^5$ ........................ G03G 5/14; G03G 15/22; H04N 1/21

[52] U.S. Cl. ........................................ 430/58; 430/60; 430/64; 355/211; 358/302

[58] Field of Search .............................. 430/60, 64, 58

[56] References Cited

U.S. PATENT DOCUMENTS

| | | | |
|---|---|---|---|
| 3,891,435 | 6/1975 | Lee | 430/64 |
| 4,025,407 | 5/1977 | Chang et al. | 522/142 |
| 4,446,217 | 5/1984 | Takasu et al. | 430/60 X |
| 4,946,766 | 8/1990 | Fukagai | 430/60 |
| 5,079,117 | 1/1992 | Koyama et al. | 430/58 |
| 5,089,364 | 2/1992 | Lee et al. | 430/64 X |

FOREIGN PATENT DOCUMENTS

| | | |
|---|---|---|
| 48-47344 | 7/1973 | Japan . |
| 51-126148 | 11/1976 | Japan . |
| 52-20836 | 2/1977 | Japan . |
| 52-25638 | 2/1977 | Japan . |
| 53-89435 | 8/1978 | Japan . |
| 55-103556 | 8/1980 | Japan . |
| 163346 | 7/1986 | Japan . |
| 280863 | 12/1987 | Japan . |
| 254463 | 10/1988 | Japan . |
| 2-115858 | 4/1990 | Japan . |

OTHER PUBLICATIONS

Patent Abstracts of Japan, vol. 12, No. 147 (p. 698), May 7, 1988, for JPA 62-2666553.

"Flexible Insulating Layer in Hybrid Photoconductor", Crooks et al., IBM Tech. Discl. Bull., vol. 17, No. 3, Aug. 1974 p. 905.

*Primary Examiner*—Roland Martin

*Attorney, Agent, or Firm*—Fitzpatrick, Cella, Harper & Scinto

[57] ABSTRACT

An electrophotographic photosensitive member is constituted by an electroconductive support, and an intermediate layer and a photosensitive layer disposed in this order on the support. The intermediate layer comprises a reaction product of a mixture including a polyol compound [A] and a polyisocyanate compound[B] satisfying at least one of the following conditions (i) and (ii): (i) the polyol compound [A] is a high-molecular weight polyol compound, and (ii) the polyisocyanate compound is a polyoxyalkylene segmentcontaining polyisocyanate compound. The photosensitive member shows stable electrophotographic performances over wide environmental conditions from low temperature - low humidity to high temperature - high humidity due to the intermediate layer.

12 Claims, 1 Drawing Sheet

ELECTROPHOTOGRAPHIC PHOTOSENSITIVE MEMBER AND APPARATUS USING SAME

FIELD OF THE INVENTION AND RELATED ART

The present invention relates to an electrophotographic photosensitive member, particularly one having an improved intermediate layer disposed between an electroconductive support (hereinafter simply referred to as a "support") and a photosensitive layer, and also an apparatus using such an improved electrophotographic photosensitive member.

For an electrophotographic photosensitive member of the Carlson type, it is generally important to ensure stability of a dark-part potential and a light-part potential in order to secure a constant image density on repetition of charging-exposure and provided images free from fog.

In order to ensure the potential stability, various proposals have been made, inclusive of, e.g., improvement in charge injection from the support to the photosensitive layer, improvement in adhesion between the support and the photosensitive layer, improvement in application characteristic of the photosensitive layer, and provision of an intermediate layer between the support and the photosensitive layer having a function of, e.g., covering defects on the support.

There has been also proposed a photosensitive member having a photosensitive layer of a laminated structure functionally separated into a charge generation layer and a charge transport layer. The charge generation layer is generally formed in a very thin layer of, e.g., about 0.5 micron, so that the thickness of the charge generation layer is liable to be ununiform due to defects, soiling, attachment or flaws on the surface of the support. Such an ununiform thickness of the charge generation layer, however, results in a sensitivity irregularity of the photosensitive member, so that the charge generation layer is required to be as uniform as possible.

In view of the above circumstances, it has been proposed to dispose an intermediate layer between the charge generation layer and the support functioning both as a barrier layer and an adhesive layer and also covering defects on the support.

Hitherto, as resins constituting such intermediate layers between the photosensitive layer and the support, polyamide (Japanese Laid-Open Patent Application (JP-A) 48-47344, JP-A 52-25638), polyester (JP-A 52-20836, JP-A 54-206738), polyurethane (JP-A 53-89435, JP-A H2-115858), quarternary ammonium salt-containing acrylic polymer (JP-A 51-126148), and casein (JP-A 55-103556) have been used.

However, an intermediate layer composed of a material as described above changes its electric resistance corresponding to changes in environmental temperature and humidity, so that it has been difficult to ensure a stable potential characteristic over wide environmental conditions ranging from low temperature—low humidity to high temperature—high humidity by using an electrophotographic photosensitive member incorporating such an intermediate layer.

For example, when such a photosensitive member is repeatedly used under low temperature—low humidity conditions tending to increase the electric resistance of the intermediate layer, some charges remain in the intermediate layer to increase the light-part potential and the residual potential, thus resulting in fog in copied images. Further, in case where such a photosensitive member is used in an electrophotographic printer of the reversal development type, the resultant images are liable to be thin in density and fail to provide copies with a prescribed quality.

On the other hand, under high temperature—high humidity conditions, such an intermediate layer is liable to cause an inferior barrier function due to a lowering in electric resistance, thus resulting in an increase in carrier injection from the support side to cause a lowering in dark-part potential. As a result, under high temperature—high humidity conditions, copy images become thin. When such a photosensitive member is used in an electrophotographic printer of the reversal development type, the resultant images are liable to be accompanied with black spotty defects (black spots). Further, the above-mentioned photosensitive member of prior art having an intermediate layer comprising a cured layer of a polyurethane which is a reaction product between a polyether compound and a low-molecular weight polyisocyanate compound, shows an effect of decreasing fog due to a lowering in electric resistance but is still accompanied with a problem that the resultant images are liable to be accompanied with black spotty defects (black spots).

SUMMARY OF THE INVENTION

Accordingly, an object of the present invention is to provide an electrophotographic photosensitive member capable of retaining a stable potential characteristic and thus stably forming images over wide environmental conditions ranging from low temperature—low humidity to high temperature—high humidity conditions.

Another object of the present invention is to provide an electrophotographic photosensitive member capable of forming good images free from defects.

A further object of the present invention is to provide electrophotographic apparatus using such an improved photosensitive member.

According to the present invention, there is provided an electrophotographic photosensitive member, comprising: an electroconductive support, and an intermediate layer and a photosensitive layer disposed in this order on the support, wherein said intermediate layer comprises a reaction product of a mixture including a polyol compound [A] and a polyisocyanate compound [B] satisfying at least one of the following conditions (i) and (ii):

(i) the polyol compound [A] is a high-molecular weight polyol compound.

(ii) the polyisocyanate compound is a polyoxyalkylene segment-containing polyisocyanate compound.

Thus, according to the electrophotographic photosensitive member of the present invention, by using an intermediate layer comprising a reaction product between the specific polyol compound and polyisocyanate compound between the support and the photosensitive layer, it is possible to retain a stable potential characteristic and form good images over wide environmental conditions from low temperature—low humidity to high temperature—high humidity.

These and other objects, features and advantages of the present invention will become more apparent upon a consideration of the following description of the preferred embodiments of the present invention taken in conjunction with the accompanying drawings.

PREFERRED EMBODIMENT OF THE INVENTION

Figure 1:
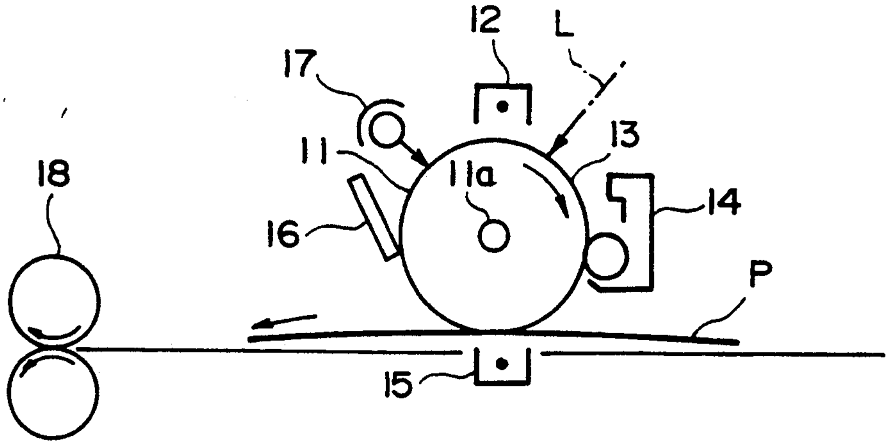
FIG. 1 is a schematic sectional view of a transfer-type copying machine loaded with an electrophotographic photosensitive member according to the present invention.

The polyoxyalkylene segment-containing polyisocyanate compound used in the present invention may preferably contain one or more substituted or unsubstituted oxyalkylene segments each having 2–10 carbon atoms. The substituent for the oxyalkylene segment may for example be a halogen atom, such as fluorine, chlorine, bromine or iodine, or an aryl group, such as phenyl or naphthyl.

The polyoxyalkylene segment-containing polyisocyanate compound may, for example, be synthesized by reaction between a polyoxyalkylene polyol and a polyisocyanate. The reagents may preferably be used in a proportion range of 1.0/1 to 5.0/1 in terms of a functional group molar ratio (NCO group/OH group) between the isocyanate (NCO) and hydroxyl (OH) groups.

The polyoxyalkylene segment-containing polyisocyanate compound may preferably have a number—average molecular weight (Mn) of 500–20,000. In the case of using the polyoxyalkylene segment-containing polyisocyanate compound, it is possible to also use another polyisocyanate compound as desired. Such other polyisocyanate compound may, for example, be selected from polyisocyanates as will be described below.

The polyoxyalkylene polyol may, for example, be prepared through a process wherein one or more species of alkylene oxides are polymerized or copolymerized together with an active hydrogen compound in the presence of a catalyst, and the product is treated for removal of the catalyst by an ordinary purification method, such as ion exchange, neutralization-filtration, or adsorption.

The above hydrogen compound may be a compound having two or more active hydrogen atoms, and examples thereof may include: polyhydric alcohols, such as ethylene glycol, propylene glycol, 1,4-butanediol, glycerine, trimethylolpropane, pentaerythritol, sorbitol, and sucrose; amine compounds, such as monoethanolamine, ethylenediamine, diethylenetriamine, 2-ethylhexylamine, and hexamethylenediamine; and phenolic active hydrogen compounds, such as bisphenol A and hydroquinone.

Examples of the alkylene oxide having 2–10 carbon atoms may include: ethylene oxide, propylene oxide, butylene oxide, hexene oxide, cyclohexene oxide, and nonene oxide.

As the catalyst, basic catalysts such as sodium methoxide, sodium hydroxide, potassium hydroxide, lithium carbonate and triethylamine may generally be used, but an acid catalyst such as boron trifluoride can also be used.

Examples of the polyisocyanate compound to be used in the present invention other than the polyoxyalkylene segment-containing polyisocyanate compound described above or used for providing the polyoxyalkylene segment-containing polyisocyanate compound may include: 2,4-toluene diisocyanate, 2-6-toluene diisocyanate, 4,4'-diphenylmethane diisocyanate, hexamethylene diisocyanate, isophorone diisocyanate, and mixtures thereof.

The polyoxyalkylene segment-containing polyisocyanate compound can also be used in a blocked isocyanate form (terminal-protected isocyanate). The blocking agent may for example be methyl ethyl ketoxime, phenol, caprolactam, ethyl acetoacetate, methanol or sodium hydrogen sulfite.

The blocking may be effected by adding such a blocking agent to the polyoxyalkylene segmentcontaining polyisocyanate compound and performing the reaction at 30°–90° C. for 0.5–2 hours.

Some examples of the polyoxyalkylene segment-containing polyisocyanate compound used in the present invention are shown in the following Table 1.

TABLE 1

Examples of polyoxyalkylene segment-containing polyisocyanate compound

| | Active hydrogen compound | Oxyalkylene segment Number of carbon atoms *4, *5 | | | | | Substituent and rate of substitution (%) | Polymer form | | | Isocyanate *8 | Reactants mol. ratio NCO/OH | Blocking agent *9 |
|---|---|---|---|---|---|---|---|---|---|---|---|---|---|
| | | 2 | 3 | 4 | 6 | 9 | | BK *6 | BK *7 | Mn *11 | | | |
| 1 | glycerine | 20 | 80 | | | | | | ∘ | 3000 | EMDI | 2.1 | MEKO |
| 2 | " | 20 | 80 | | | | | ∘ | | 4000 | " | 2.2 | none |
| 3 | " | 20 | 80 | | | | | | ∘ | 5000 | " | 2.3 | MEKO |
| 4 | " | 50 | 50 | | | | | ∘ | | 2000 | " | 2.4 | none |
| 5 | " | 50 | 50 | | | | | | ∘ | 3000 | " | 2.4 | none |
| 6 | " | 80 | 10 | | | 10 | | | ∘ | 2500 | " | 1 | MEKO |
| 7 | " | | 100 | | | | | | | 5000 | " | 2.3 | " |
| 8 | DEG *1 | 20 | 70 | 10 | | | | | ∘ | 1000 | " | 2.1 | " |
| 9 | " | 50 | 40 | 10 | | | | | ∘ | 1500 | " | 2.1 | " |
| 10 | " | 80 | 10 | 10 | | | | ∘ | | 2000 | " | 2.1 | " |
| 11 | 1,4-BD *2 | 30 | 30 | 40 | | | | | ∘ | 1000 | HMDI | 2.1 | $NaHSO_3$ |
| 12 | " | 50 | 20 | 30 | | | | | ∘ | 2000 | " | 2.1 | " |
| 13 | TMP *3 | 30 | 70 | | | | | ∘ | | 3000 | TDI-100 | 2.3 | caprolactam |
| 14 | " | 50 | 50 | | | | | | ∘ | 4000 | " | 2.3 | " |
| 15 | " | 70 | 30 | | | | | | ∘ | 5000 | TDI-100 | 2.3 | none |
| 16 | " | 80 | 10 | | 10 | | | ∘ | | 2000 | " | 2.3 | " |
| 17 | " | 90 | | 10 | | | | | ∘ | 3000 | " | 2.3 | MEKO |
| 18 | " | 90 | | 10 | | | | ∘ | | 4000 | " | 2.3 | none |
| 19 | " | 60 | 30 | | | 10 | | | ∘ | 5000 | " | 2.3 | phenol |
| 20 | PETL *10 | 30 | 70 | | | | | | ∘ | 6000 | " | 2.2 | " |
| 21 | " | 40 | 60 | | | | | | ∘ | 8000 | " | 2.2 | MEKO |
| 22 | " | 60 | 30 | 10 | | | chlorine 5% | | ∘ | 10000 | " | 2.2 | " |
| 23 | " | 80 | | | 20 | | chlorine 10% | | ∘ | 12000 | " | 2.2 | " |

TABLE 1-continued

| | Active hydrogen compound | Examples of polyoxyalkylene segment-containing polyisocyanate compound | | | | | | | | | | | |
|---|---|---|---|---|---|---|---|---|---|---|---|---|---|
| | | Oxyalkylene segment Number of carbon atoms *4, *5 | | | | | Substituent and rate of substitu- | Polymer form | | | Isocyanate | Reactants mol. ratio | Blocking |
| | | 2 | 3 | 4 | 6 | 9 | tion (%) | BK *6 | BK *7 | Mn *11 | *8 | NCO/OH | agent *9 |
| 24 | sorbitol | 20 | 80 | | | | | | ∘ | 12000 | MDI | 2.1 | none |
| 25 | " | 40 | 60 | | | | | | ∘ | 15000 | " | 2.1 | none |
| 26 | " | 40 | 50 | | | 10 | | | ∘ | 15000 | " | 2.1 | MEKO |
| 27 | " | 40 | 60 | | | | phenol 5% | | ∘ | 18000 | " | 2.1 | " |
| 28 | glycerine | 20 | 80 | | | | phenol 2% | ∘ | | 4000 | " | 2.1 | phenol |
| 29 | " | 40 | 60 | | | | | | ∘ | 5000 | " | 2.1 | " |
| 30 | " | 70 | 30 | | | | | ∘ | | 4000 | " | 2.1 | " |

Notes to Table 1
*1: diethylene glycol
*2: 1,4-butanediol
*3: blocked form
*4: Number of carbon atoms
2: ethylene oxide
3: propylene oxide
4: butylene oxide
6: cyclohexene oxide
9: nonene oxide
*5: Numeral denotes the content (wt. %) of the polyoxyalkylene segment
*6: block polymer
*7: random polymer
*8: HMDI: hexamethylene diisocyanate
TDI-100: 2,6-toluene diisocyanate
MDI: 4,4'-diphenylmethane diisocyanate
*9: MEKO: methyl ethyl ketoxime
*10: pentaerithritol
*11: Mn = number-average molecular weight On the other hand, the high-molecular weight polyol compound may, for example, be a compound obtained by reacting for addition of a polyoxyalkylene polyol as described above to the isocyanate terminals of the above-mentioned polyoxyalkylene segment-containing polyisocyanate compound.

In the present invention, it is possible to also use another polyol compound, as desired, which may include polyoxyalkylene polyol (i.e., polyether polyol) as a preferred example, and also polyester polyol, acrylic polyol, etc.

The polyoxyalkylene segment containing polyisocyanate compound and the polyol compound may preferably be reacted in a proportion range of 1.0/1 to 2.0/1 in terms of a functional group molar ratio (NCO/OH).

Examples of the polyol compound used in the present invention are shown in the following Table 2.

TABLE 2

| Example | Active hydrogen compound | Polyol compounds | | | | | |
|---|---|---|---|---|---|---|---|
| | | Oxyalkylene segment Number of carbon atoms *5, *6 | | | Polymer form | | |
| | | 2 | 3 | 4 | BK *7 | RM *8 | Mn *10 |
| A | glycerine | 80 | 20 | | | ∘ | 600 |
| B | " | 50 | 50 | | ∘ | | 500 |
| C | EG *1 | 100 | | | | | 300 |
| D | " | 60 | 40 | | | ∘ | 400 |
| E | Bisphenol A | 50 | 50 | | ∘ | | 500 |
| F | TMP *2 | 90 | | 10 | | ∘ | 800 |
| G | " | 70 | | 30 | | ∘ | 500 |
| H | PETL *3 | 40 | 60 | | | ∘ | 600 |
| I | sorbitol | 80 | 20 | | | ∘ | 600 |
| J | " | 50 | 50 | | ∘ | | 1500 |
| K | PG *4 | | 100 | | | | 4000 |
| L | glycerine | | | | | | 92 |

TABLE 2-continued

| Example | Active hydrogen compound | Polyol compounds | | | | | |
|---|---|---|---|---|---|---|---|
| | | Oxyalkylene segment Number of carbon atoms *5, *6 | | | Polymer form | | |
| | | 2 | 3 | 4 | BK *7 | RM *8 | Mn *10 |
| M | High-molecular weight polyol (No. 18 + C)*9 | | | | | | 5420 |

*1: ethylene glycol
*2: trimethyl propane
*3: pentaerythritol
*4: propylene glycol
*5: Number of carbon atoms
2: ethylene oxide
3: propylene oxide
4: butylene oxide
*6: Numeral denotes the content (wt. %) of the polyoxyalkylene segment
*7: block form
*8: random form
*9: A high-molecular weight polyol obtained by addition-reacting Polyol compound Example C with Polyisocyanate compound Example No. 18 in Table 1 as describe hereinbelow in Synthesis Example 2.
*10: Mn = number-average molecular weight Hereinbelow, some examples of synthesis of the polyoxyalkylene segment-containing polyisocyanate compound and the high-molecular weight polyol compound are described.

SYNTHESIS EXAMPLE 1

Example Compound No. 18

135 g of trimethylolpropane as a starting material was reacted with 3750 g of ethylene oxide and 420 g of butylene oxide in the presence of 12 g of potassium hydroxide in a 5 liter-autoclave at 120° C. for 6 hours, followed by desalting purification to obtain 3900 g of a polyether (having an Mn (number-average molecular weight) of 4000 as calculated from the hydroxyl value).

To 100 g of the polyether, 13.7 g of 2,6-toluene diisocyanate (TDI-100), and the resultant mixture was reacted under stirring at 90° C. for 3 hours to synthesize a polyoxyalkylene segment-containing polyisocyanate compound (No. 18).

SYNTHESIS EXAMPLE 2

Example Compound M

To 100 g of the polyoxyalkylene segment-containing polyisocyanate compound (No. 18) obtained in Synthesis Example 1, 20 g of a polyol compound C shown in Table 1 was added, and the resultant mixture was reacted under stirring at 80° C. for 4 hours to obtain a high-molecular weight polyol compound M (Mn=5420 as calculated from the hydroxyl value).

SYNTHESIS EXAMPLE 3

Example Compound No. 1

92 g of glycerine as a starting material was reacted with 620 g of ethylene oxide and 2480 g of propylene oxide in the presence of 9 g of potassium hydroxide in a 5 liter-autoclave at 120° C. for 6 hours, followed by desalting purification to obtain 2900 g of a polyether (Mn=3000 (as calculated from the hydroxyl value)).

To 100 g of the polyether, 18.6 g of hexamethylene diisocyanate (HMDI) was added, and the mixture was reacted under stirring at 90° C. for 3 hours. Then, 9.7 g of methyl ethyl ketoxime (MEKO) and 100 g of methyl ethyl ketone (MEK) were added, and the mixture was stirred at 60° C. for 1 hour to obtain a polyoxyalkylene segment-containing polyisocyanate compound (No. 1).

For the reaction between the polyol compound and the polyisocyanate compound, it is possible to use a catalyst for accelerated reaction. The catalyst used for this purpose may for example include: amine catalysts, such as triethylamine, dimethylethanolamine, and triethylenediamine; and metal salt catalysts, such as zinc octylate, tin octylate and dibutyltin dilaurate.

The intermediate layer of the photosensitive member according to the present invention may be composed of a single layer comprising a reaction product between the above-mentioned polyol compound and polyisocyanate compound, but can also assume a laminated structure including plural layers, at least one of which comprises the above-mentioned reaction product. In case where the intermediate layer is composed of plural layers, another layer not comprising the above-mentioned reaction product may comprise a resin material, such as polyamide, polyester or phenolic resin.

The intermediate layer used in the present invention can further contain, e.g., another resin, additive or electroconductive substance, according to necessity.

Examples of such an electroconductive substance may include: powder or short fibers of metals such as aluminum, copper, nickel, and silver; electroconductive metal oxides, such as antimony oxides, indium oxide and tin oxide; carbon film, carbon black and graphite powder; and electroconductive obtained by coating with such an electroconductive substance.

The thickness of the intermediate layer according to the present invention may be determined in view of electrophotographic characteristics and influence of defects on the support and may generally be set within the range of 0.1-50 microns, more suitably 0.5-30 microns.

The intermediate layer may be formed by an appropriate coating method, such as dip coating, spray coating or roller coating.

In the present invention, the photosensitive layer may be either of a single layer-type or of a laminated layer-type functionally separated into a charge generation layer and a charge transport layer.

A charge generation layer of the laminated layer-type photosensitive layer may for example be prepared by dispersing a charge-generating substance, such as azo pigment, quinone pigment, quinocyanine pigment, perylene pigment, indigo pigment, azulenium salt pigment or phthalocyanine pigment into a solution containing a resin such as polyvinyl butyral, polystyrene, polyvinyl acetate, acrylic resin, polyvinylpyrrolidone, ethyl cellulose or cellulose acetate butyrate to form a coating liquid, and applying the coating liquid onto the above-mentioned intermediate layer. The charge generation layer may have a thickness of at most 5 microns, preferably 0.05 -2 microns.

A charge transport layer may be formed on such a charge generation layer by dissolving a charge transporting substance of, e.g., a polycyclic aromatic compound having a structure of biphenylene, anthracene, pyrene, phenanthrene, etc., in its main chain or side chain, a nitrogen-containing cyclic compound such as indole, carbazole, oxadiazole or pyrazoline, triarylamine compound, hydrazone compound, or styryl compound into a solution of a film-forming resin to form a coating liquid, and applying the coating liquid The film-forming resin may for example include polyester, polycarbonate, polymethacrylate and polystyrene.

The charge transport layer may ordinarily have a thickness of 5-40 microns, preferably 10-30 microns.

The laminated layer-type photosensitive layer can also assume a structure wherein the charge generation layer is disposed on the charge transport layer.

A single layer-type photosensitive layer may be formed as a layer containing both the charge generating substance and the charge transporting substance together in a resin.

In the present invention, it is also possible to constitute the photosensitive layer as a layer of an organic photoconductive polymer, such as polyvinylcarbazole or polyvinylanthracene, a vapordeposition layer of a charge generation substance as described above, a vapor-deposited selenium layer, a vapor-deposited selenium-tellurium layer, or an amorphous silicon layer.

On the other hand, the support used in the present invention may be any one as far as it has an electroconductivity, inclusive of, e.g., a metal, such as aluminum, copper, chromium, nickel, zinc or stainless steel formed into a cylinder or sheet; a plastic film or paper laminated with a foil of a metal such as aluminum or copper, a plastic film provided thereon with a vapor-deposited layer of, e.g., aluminum, indium oxide or tin oxide, or a plastic film or paper coated with an electroconductive layer of an electroconductive substance alone or dispersed in an appropriate binder resin.

The electrophotographic photosensitive member according to the present invention may be applicable to an electrophotographic apparatus in general, inclusive of a copying machine, a laser printer, an LED printer and a liquid crystal shutter-type printer, and further widely applicable to apparatus, such as a display, a recording apparatus, a mini-scale printing, a plate production apparatus and a facsimile apparatus utilizing electrophotography in an applied form.

FIG. 1 shows a schematic structural view of an ordinary transfer-type electrophotographic apparatus using an electrophotosensitive member of the invention. Referring to FIG. 1, a photosensitive drum (i.e., photosensitive member) 11 as an image-carrying member is rotated about an axis 11*a* at a prescribed peripheral speed in the direction of the arrow shown inside of the photosensitive drum 11. The surface of the photosensitive drum is uniformly charged by means of a charger 12 to have a prescribed positive or negative potential. The photosensitive drum 11 is exposed to light-image L (as by slit exposure or laser beam-scanning exposure) by using an image exposure means (not shown), whereby an electrostatic latent image corresponding to an exposure image is successively formed on the surface of the photosensitive drum 11. The electrostatic latent image is developed by a developing means 14 to form a toner image. The toner image is successively transferred to a transfer material P which is supplied from a supply part (not shown) to a position between the photosensitive drum 11 and a transfer charger 15 in synchronism with the rotating speed of the photosensitive drum 11, by means of the transfer charger 15. The transfer material P with the toner image thereon is separated from the photosensitive drum 11 to be conveyed to a fixing device 18, followed by image fixing to print out the transfer material P as a copy outside the electrophotographic apparatus. Residual toner particles on the surface of the photosensitive drum 11 after the transfer are removed by means of a cleaner 16 to provide a cleaned surface, and residual charge on the surface of the photosensitive drum 11 is erased by a pre-exposure means 17 to prepare for the next cycle. As the charger 12 for charging the photosensitive drum 11 uniformly, a corona charger is widely used in general. As the transfer charger 15, such a corona charger is also widely used in general.

According to the present invention, in the electrophotographic apparatus, it is possible to provide an apparatus unit which includes plural means inclusive of or selected from the photosensitive member (photosensitive drum), the charger, the developing means, the cleaner, etc. so as to be attached to or released from the apparatus body, as desired. The device unit may, for example, be composed of the photosensitive member and the cleaner to prepare a single unit capable of being attached to or released from the body of the electrophotographic apparatus by using a guiding means such as a rail in the body. The apparatus unit can be further accompanied with the charger and/or the developing means to prepare a single unit.

In a case where the electrophotographic apparatus is used as a copying machine or a printer, exposure light-image L may be given by reading data on reflection light or transmitted light from an original or, converting the data on the original into a signal and then effecting a laser beam scanning, a drive of LED array or a drive of a liquid crystal shutter array.

Figure 2:
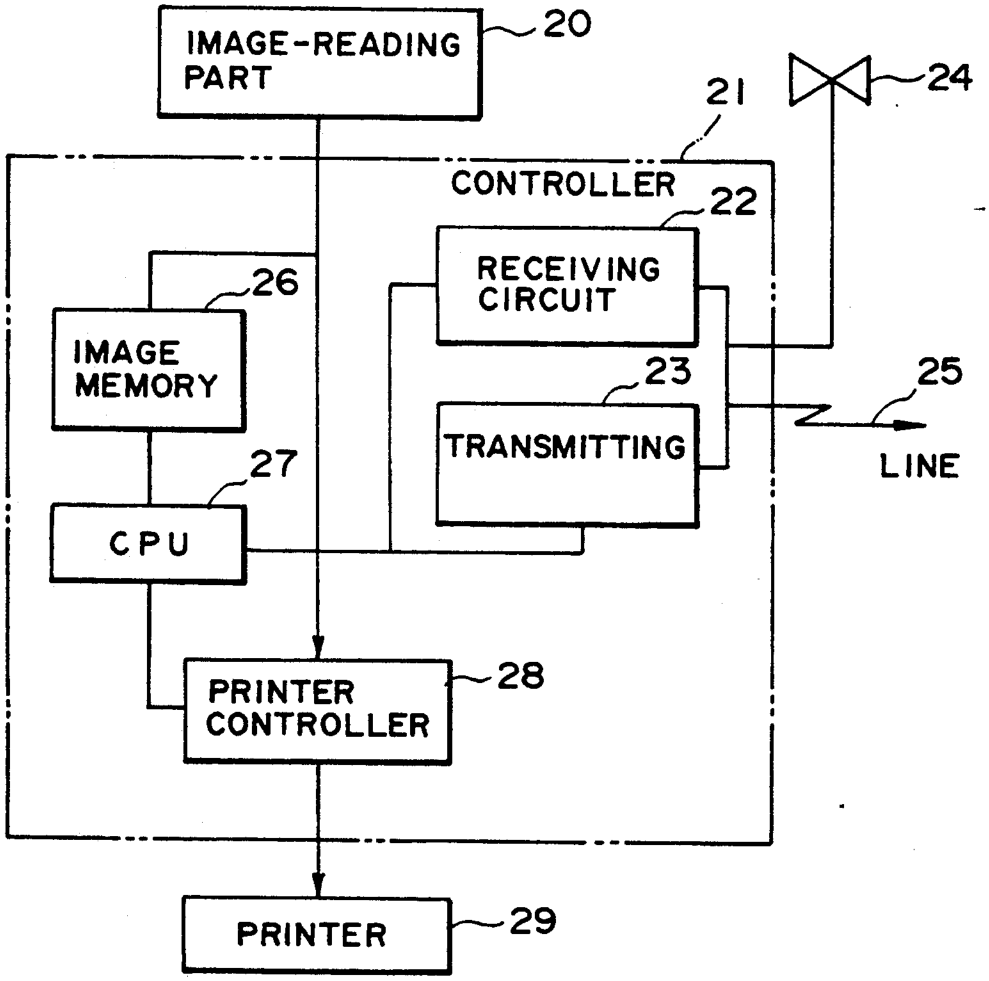
FIG. 2 is a block diagram of a facsimile system using a printer incorporating an electrophotographic photosensitive member according to the present invention.

In a case where the electrophotographic apparatus according to the present invention is used as a printer of a facsimile machine, exposure light-image L is given by exposure for printing received data. FIG. 2 shows a block diagram of an embodiment for explaining this case. Referring to FIG. 2, a controller 21 controls an image-reading part 20 and a printer 29. The whole controller 21 is controlled by a CPU (central processing unit) 27. Read data from the image-reading part is transmitted to a partner station through a transmitting circuit 23, and on the other hand, the received data from the partner station is sent to the printer 29 through a receiving circuit 22. An image memory memorizes prescribed image data. A printer controller 28 controls the printer 29, and a reference numeral 24 denotes a telephone handset.

The image received through a line 25 (the image data sent through the circuit from a connected remote terminal) is demodulated by means of the receiving circuit 22 and successively stored in an image memory 26 after a restoring-signal processing of the image data. When image for at least one page is stored in the image memory 26, image recording of the page is effected. The CPU 27 reads out the image data for one page from the image memory 26 and sends the image data for one page subjected to the restoringsignal processing to the printer controller 28. The printer controller 28 receives the image data for one page from the CPU 27 and controls the printer 29 in order to effect image-data recording. Further, the CPU 27 is caused to receive image for a subsequent page during the recording by the printer 29. As described above, the receiving and recording of the image are performed.

Hereinbelow, the present invention will be explained based on Examples wherein "part(s)" means "part(s) by weight".

EXAMPLE 1

A polyisocyanate compound and a polyol compound are selected from those listed in Tables 1 and 2, respectively, and a paint for an intermediate layer having the following composition was prepared by mixing.

| | |
|---|---|
| Polyisocyanate compound [No. 1] | 17.2 part(s) |
| Polyol compound [A] | 2.8 part(s) |
| Dibutyltin dilaurate (DBTL) | 0.02 part(s) |
| Methyl ethyl ketone (MEK) | 80 part(s) |

The paint was applied onto an aluminum cylinder (OC (outer diameter)=30 mm, L (length)=360 mm) by dipping and then dried and cured at 150° C. for 30 min. to form a 3.0 micron-thick intermediate layer.

Separately, 4 parts of a disazo pigment represented by the following formula:

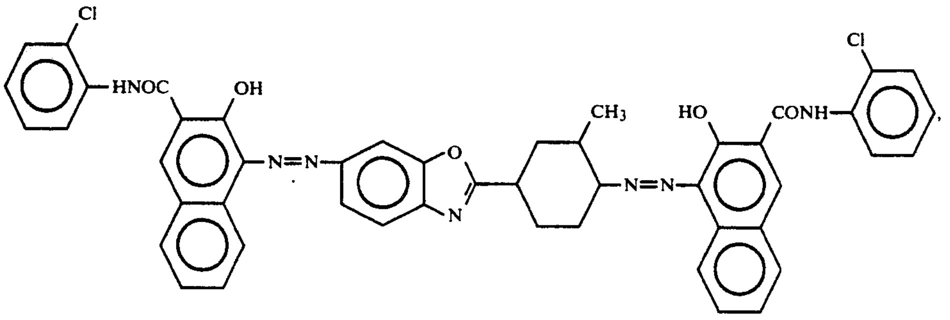

2 parts of of a butyral resin (butyral degree: 68 %, Mw (weight-average molecular weight): 24000) and 34 parts of cyclohexanone were dispersed for 8 hours by means of a sand mill containing 1 mm-dia. glass beads and diluted with 60 parts of tetrahydrofuran (THF) to prepare a coating liquid. The thus prepared coating liquid was applied by dipping onto the above prepared intermediate layer and dried at 80° C. for 15 min. form a 0.2 micron-thick charge generation layer.

Then, 10 parts of a hydrazone compound of the formula:

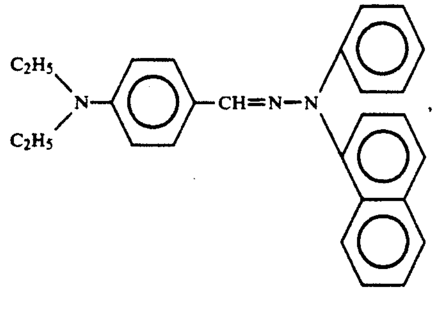

10 parts of a bisphenol Z-type polycarbonate (Mw=30000), 10 parts of dichloromethane and 50 parts of monochlorobenzene were dissolved in mixture to form a coating liquid for a charge transport layer. The coating liquid was applied onto the above-formed charge generation layer by dipping and dried for 60 min. at 110° C. to form a 20 micron-thick charge transport layer.

The thus-prepared electrophotographic photosensitive member was incorporated in a copying apparatus, and the electrophotographic performances thereof were evaluated by a process wherein steps of charging-exposure-development-transfer-cleaning were repeated at a cycle of 0.8 sec under low temperature—low humidity conditions (15° C. - 15%RH). The results are summarized in Table 3 appearing hereinafter.

As is shown in Table 3, the photosensitive member showed a large difference between the dark-part potential ($V_D$) and light-part potential ($V_L$), thus providing a sufficient contrast. Further, as a result of 1000 sheets of successive image formation, images could be formed in a very stable state without causing an increase in light-part potential ($V_L$).

EXAMPLES 2-5

Electrophotographic photosensitive members were prepared in the same manner as in Example 1 except that the following compositions were respectively used for preparing the intermediate layers.

| | |
|---|---|
| [Example 2] | |
| Polyisocyanate compound [No.2] | 18.1 part(s) |
| Polyol compound [B] | 1.9 part(s) |
| [Example 3] | |
| Polyisocyanate compound [No.13] | 17.8 part(s) |
| Polyol compound [H] | 2.2 part(s) |
| [Example 4] | |
| Polyisocyanate compound [No.17] | 13.5 part(s) |
| Polyol compound [I] | 6.5 part(s) |
| [Example 5] | |
| 4,4'-Diphenylmethane diisocyanate (MDI) | 1.4 part(s) |
| Polyol compound [M] | 18.6 part(s) |

The above-prepared photosensitive members were evaluated in the same manner as in Example 1. As a result, the respective photosensitive members showed a large difference between dark-part potential ($V_D$) and light-part potential ($V_L$), thus providing a sufficient potential contrast. Further, as a result of 1000 sheets of successive image formation, the respective photosensitive members provided images in a very stable state while causing almost no increase in light-part potential ($V_L$).

The results are also summarized in Table 3.

COMPARATIVE EXAMPLES 1 AND 2

Electrophotographic photosensitive members were prepared in the same manner as in Example 1 except that the following compositions were respectively used for preparing the intermediate layers.

| | |
|---|---|
| [Comparative Example 1] | |
| Alcohol-soluble copolymer nylon ("Amilan CM-8000", mfd. by Toray K.K.) | 5 part(s) |
| Methanol | 95 part(s) |
| [Comparative Example 2] | |
| Polyester polyol ("Nippolan 125", mfd. by Nihon Polyurethane Kogyo K.K.) | 14 part(s) |
| 2,6-Toluene diisocyanate (TDI) | 6 part(s) |
| DBTL | 0.02 part(s) |
| MEK | 80 part(s) |

The photosensitive members were evaluated in the same manner as in Example 1. As a result, both photosensitive members showed an increase in light-part potential ($V_L$), thus resulting in images accompanied with fog after 1000 sheets of successive copying.

The results are also summarized in Table 3 below.

TABLE 3

| | Initial stage | | After 1000 sheets of sucessive copying | |
|---|---|---|---|---|
| | Dark-port potential $V_D$(−V) | Light-part potential $V_L$(−V) | Light-part potential $V_L$(−V) | Image evaluation |
| Example | | | | |
| 1 | 660 | 190 | 210 | Good |
| 2 | 650 | 185 | 200 | Good |
| 3 | 665 | 185 | 195 | Good |
| 4 | 650 | 195 | 205 | Good |
| 5 | 670 | 210 | 225 | Good |
| Comp. Example | | | | |
| 1 | 665 | 190 | 325 | Fog occurred |
| 2 | 670 | 200 | 360 | Fog occurred |

The term "Good" in the "Image" column in Tables 3-5, represents—Free from lack spots or fog (by naked eye observation).

| Example 6 | |
|---|---|
| Resol-type phenolic resin | 25 parts |
| Electroconductive titanium oxide powder (coated with tin oxide containing 10% of antimonyl oxide) | 50 parts |
| Methyl cellosolve | 20 parts |
| Methanol | 5 parts |

The above-ingredients were subjected to 2 hours of mixing and dispersion in a sand mill containing 1 mm-dia. glass beads to prepare a paint for a first intermediate layer.

The paint was applied onto an aluminum cylinder (OD=30 mm, L=260 mm) by dipping and then dried and cured at 150° C. for 20 min. to form a 20 micron-thick first intermediate layer.

| | |
|---|---|
| Polyisocyanate compound [No. 30] | 17.3 part(s) |
| Polyol compound [F] | 2.7 part(s) |
| DBTL | 0.02 part(s) |
| MEK | 80 part(s) |

The above ingredients were dissolved in mixture to form a paint for a second intermediate layer, which was then applied by dipping onto the first intermediate layer and dried and cured at 150° C. for 20 min. to form a 0.6 micron-thick second intermediate layer.

Then, 3 parts of a disazo pigments of the formula:

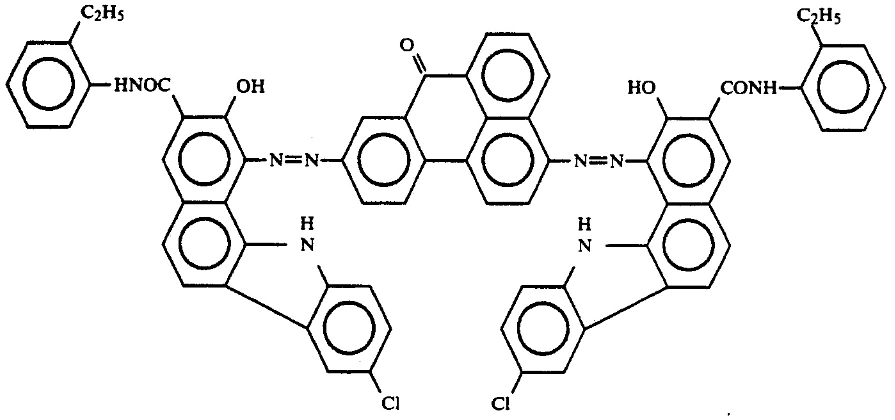

2 parts of polyvinyl benzal (benzal degree=80% , Mw=11000) and 35 parts of cyclohexanone were subjected to 12 hours of mixing and dispersion by a sand mill containing 1 mm-dia glass beads and further dispersed after adding 60 parts of methyl ethyl ketone (MEK) to form a coating liquid for a charge generation layer. The coating liquid was applied by dipping onto the above second intermediate layer and dried at 80° C. for 20 min. to form a 0.2 micron-thick charge generation layer.

Then, 10 parts of a styryl compound of the formula:

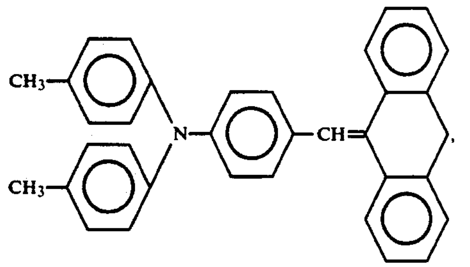

10 parts of a bisphenol Z-type polycarbonate (Mw=30000), 15 parts of dichloromethane and 45 parts of monochlorobenzene were dissolved in mixture to form a coating liquid for a charge transport layer. The coating liquid was applied onto the above-formed charge generation layer by dipping and dried for 60 min. at 120° C. to form a 18 micron-thick charge transport layer.

The thus-prepared electrophotographic photosensitive member was incorporated in a laser printer of the reversal development type, and the electrophotographic performances thereof were evaluated by a process wherein steps of charging-exposure-development-transfer-cleaning were repeated at a cycle of 1.5 sec under normal temperature—normal humidity conditions (23° C.—50%RH) and high temperature—high humidity conditions (30° C.—85%RH). The results are summarized in Table 4 appearing hereinafter.

As is shown in Table 4, the photosensitive member showed a large difference between the dark-part potential ($V_D$) and light-part potential ($V_L$), thus providing a sufficient contrast. Further, also under the high temperature—high humidity conditions, the dark-part potential was stable and good images free from black spots or fog could be formed.

EXAMPLES 7-10

Electrophotographic photosensitive members were prepared in the same manner as in Example 6 except that the following compositions were respectively used for preparing the second intermediate layers.

| | |
|---|---|
| [Example 7] | |
| Polyisocyanate compound [No. 24] | 18.8 part(s) |
| Polyol compound [C] | 1.2 part(s) |
| [Example 8] | |
| Polyisocyanate compound [No. 19] | 18.7 part(s) |
| Polyol compound [J] | 1.3 part(s) |
| [Example 9] | |
| Polyisocyanate compound [No. 6] | 17.0 part(s) |
| Polyol compound [D] | 3.0 part(s) |
| Tin octylate (SOCT) | 0.02 part(s) |
| [Example 10] | |
| Polyisocyanate compound [No. 11] | 6.5 part(s) |
| Polyol compound [M] | 13.5 part(s) |

The above-prepared photosensitive members were evaluated in the same manner as in Example 6. As a result, each photosensitive member maintained a stable dark-part potential ($V_D$) even under high temperature—high humidity conditions and could provide good images free from occurrence of black spots or fog. The results are summarized in Table 4.

COMPARATIVE EXAMPLES 3 AND 4

Electrophotographic photosensitive members were prepared in the same manner as in Example 6 except that the following compositions were respectively used for preparing the second intermediate layers.

| [Comparative Example 3] | |
|---|---|
| N-methoxylated 6-nylon (Mw = 50000, methoxymethyl-substitution rate = 28%) | 5 part(s) |
| Methanol | 95 part(s) |
| [Comparative Example 4] | |
| Poly(oxypropylene)triol (hydroxy value = 170 mgKOH/g) | 15 part(s) |
| TDI | 5 part(s) |
| DBTL | 0.02 part(s) |
| MEK | 80 part(s) |

The photosensitive members were evaluated in the same manner as in Example 6. As a result, the photosensitive member according to Comparative Example 3 showed a decrease in chargeability to lower the dark-part potential ($V_D$) under the high temperature—high humidity conditions and also provided images accompanied with black spots and fog. On the other hand, the photosensitive member according to Comparative Example 4 did not show a decrease in chargeability under the high temperature—high humidity conditions, but the resultant images were accompanied with black spots.

The results are summarized in Table 4.

TABLE 4

| | Environmental conditions | | | |
|---|---|---|---|---|
| | 23° C., 50% RH | | 30° C., 85% RH | |
| | $V_D(-V)$ | $L_L(-V)$ | $V_D(-V)$ | Image |
| Example | | | | |
| 6 | 630 | 165 | 620 | Good |
| 7 | 625 | 150 | 620 | Good |
| 8 | 630 | 155 | 615 | Good |
| 9 | 640 | 170 | 625 | Good |
| 10 | 625 | 155 | 610 | Good |
| Comparative Example | | | | |
| 3 | 635 | 165 | 560 | Black spots and fog occurred |
| 4 | 630 | 165 | 610 | Black spots occurred |

| Example 11 | |
|---|---|
| Polyisocyanate compound [No. 8] | 18.2 part(s) |
| Polyol compound [F] | 1.9 part(s) |
| TDI in MEKO-blocked form | 0.9 part(s) |
| Electroconductive titanium oxide powder (coated with tin oxide containing 8% of antimony oxide) | 20 part(s) |
| Rutile-type titanium oxide powder | 20 part(s) |
| DBTL | 0.02 part(s) |
| MEK | 40 part(s) |

The above-ingredients were subjected to 3 hours of mixing and dispersion in a sand mill containing 1 mm-dia. glass beads to prepare a paint for a first intermediate layer.

The paint was applied onto an aluminum cylinder (OD=60 mm, L=260 mm) by dipping and then dried and cured at 150° C. for 20 min. to form a 15 micron-thick first intermediate layer.

Then, the paint for the second intermediate layer prepared in Example 6 was applied by dipping onto the above first intermediate layer, and dried and cured at 150° C. for 20 min. to form a 0.6 micron-thick second intermediate layer.

Then, 4 parts of a disazo pigment of the formula:

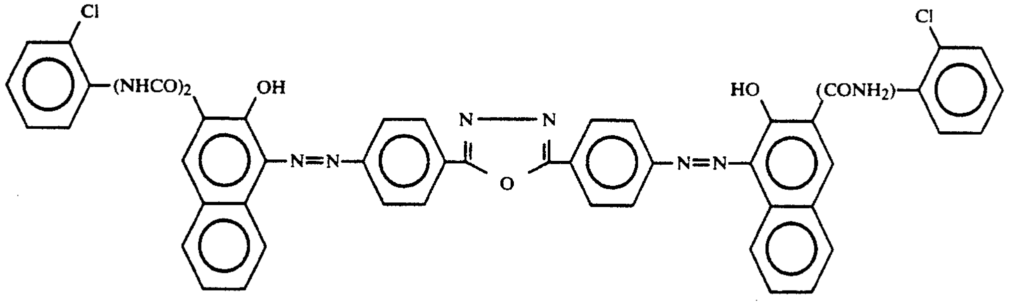

2 parts of polyvinyl butyral (butyral degree=71%, Mw =18000) and 34 parts of cyclohexanone were subjected to 6 hours of mixing and dispersion by a sand mill containing 1 mm-dia. glass beads and further dispersed after adding 60 parts of methyl ethyl ketone (MEK) to form a coating liquid for a charge generation layer. The coating liquid was applied by dipping onto the above second intermediate layer and dried at 80° C. for 15 min to form a 0.3 micron-thick charge generation layer.

Then, the coating liquid for a charge transport layer used in Example 6 was applied by dipping onto the charge generation layer and dried at 120° C. for 60 min to form a 22 micron-thick charge transport layer.

The thus-prepared electrophotographic photosensitive member was incorporated in a copying apparatus, and the electrophotographic performances thereof were evaluated by a process wherein steps of charging-exposure-development-transfer-cleaning were repeated at a cycle of 0.6 sec under low temperature low humidity conditions (10° C.—10%RH). The results are summarized in Table 5 appearing hereinafter.

As is shown in Table 5, the photosensitive member showed a large difference between the dark-part potential ($V_D$) and light-part potential ($V_L$), thus providing a sufficient contrast. Further, as a result of 1000 sheets of successive image formation, images could be formed in a very stable state without causing an increase in light-part potential ($V_L$).

| Example 12 | |
|---|---|
| Alcohol-soluble copolymer nylon ("Amilan CM-8000", mfd. by Toray K.K.) | 3 parts |
| N-methoxymethylated 6-nylon (Mw = 150000, methoxymethyl substitution rate = 30%) | 3 parts |
| Methanol | 94 parts |

An electrophotographic photosensitive member was prepared in the same manner as in Example 1 except that a coating liquid prepared from the above ingredients was used for forming the second intermediate layer.

As a result, it failed to provide a potential contrast necessary for image formation.

The results are summarized in Table 5.

TABLE 5

| | Resin components for intermediate layers | | Initial stage | | After 1000 sheets | |
|---|---|---|---|---|---|---|
| | 1st | 2nd | $V_D$ (−V) | $V_L$ (−V) | $V_L$ (−V) | Image |
| Example | | | | | | |
| 11 | 8, F | 30, F | 720 | 150 | 160 | Good |
| 12 | " | nylon | 730 | 155 | 170 | Good |
| 13 | " | none | 715 | 140 | 145 | Good |
| Comp. Example | | | | | | |
| 5 | phenolic resin | nylon | 705 | 165 | 295 | Fog occurred |
| 6 | phenolic resin | none | 385 | 180 | (Evaluation impossible) | |

EXAMPLE 13

An electrophotographic photosensitive member was prepared in the same manner as in Example 11 except that the second insulating layer was omitted to form on the support a laminated structure composed of the first intermediate layer, the charge generation layer and the charge transport layer.

The above-prepared photosensitive members of Examples 12 and 13 were evaluated in the same manner as in Example 11. As a result, each photosensitive member showed a large difference between the dark-part potential ($V_D$) and light-part potential ($V_L$), thus providing a sufficient potential contrast. Further, as a result of 1000 sheets of successive image formation, the photosensitive members provided images in a very stable state while causing almost no increase in light-part potential ($V_L$).

The results are summarized in Table 5.

| Comparative Examples 5 and 6 | |
|---|---|
| Resol-type phenolic resin | 20 parts |
| Electroconductive titanium oxide powder (coated with tin oxide containing 8% of antimony oxide) | 20 parts |
| Rutile-type titanium oxide powder | 20 parts |
| Methyl cellosolve | 25 parts |
| Methanol | 15 parts |

A paint for the first intermediate layer was prepared from the above ingredients otherwise in the same manner as in Example 11.

Electrophotographic photosensitive members of Comparative Examples 5 and 6 were prepared in the same manner as in Examples 12 and 13, respectively, except that the above-prepared paint was used for forming the first intermediate layer.

The photosensitive members were evaluated in the same manner as in Example 11. As a result, the photosensitive member of Comparative Example 5 caused an increase in light-part potential ($V_L$), after 1000 sheets of successive image formation, thus providing images accompanied with fog.

On the other hand, the photosensitive member of Comparative Example 6 having the charge generation layer and charge transport layer directly formed on the first intermediate layer showed only a low dark-part potential ($V_D$) due to insufficient barrier characteristic causing a large charge injection from the support side.

What is claimed is:

1. An electrophotographic photosensitive member comprising: an electroconductive support, an intermediate layer and a photosensitive layer disposed in this order on the support, wherein said intermediate layer comprises a reaction product of a mixture including a polyol compound (A) and a polyisocyanate compound (B) satisfying at least one of the following conditions (i) and (ii):

(i) the polyol compound (A) is a highmolecular weight polyol compound formed by an addition reaction of a polyoxyalkylene to isocyanate terminals of a polyoxyalkylene segment-containing polyisocyanate compound;

(ii) the polyisocyanate compound is a polyoxyalkylene segment-containing polyisocyanate compound.

2. A photosensitive member according to claim 1, wherein said photosensitive layer has a laminated layer-structure including a charge generation layer and a charge transport layer.

3. A photosensitive member according to claim 1, wherein said polyoxyalkylene segment-containing polyisocyanate compound has an oxyalkylene segment having 2-10 carbon atoms.

4. A photosensitive member according to claim 1, wherein said polyoxyalkylene segment-containing polyisocyanate compound is a reaction product between a polyoxyalkylene polyol and a polyisocyanate.

5. A photosensitive member according to claim 1, wherein said polyoxyalkylene segment-containing polyisocyanate compound is in a blocked isocyanate form.

6. A photosensitive member according to claim 1, wherein said polyisocyanate compound [B] is the polyoxyalkylene segment-containing polyisocyanate compound.

7. An electrophotographic apparatus unit comprising: an electrophotographic photosensitive member and at least one member selected from the group consisting of a changing means, a developing means and a cleaning means and integrally supported together with the photosensitive member to form a single unit which can be connected to or released from an apparatus body as desired; said electrophotographic photosensitive member comprising an electroconductive support, an intermediate layer and a photosensitive layer disposed in this order on the support, wherein said intermediate layer comprises a reaction product of a mixture including a polyol compound (A) and a polyisocyanate compound (B) satisfying at least one of the following conditions (i) and (ii):

(i) the polyol compound (A) is a high-molecular weight polyol compound formed by an addition reaction of a polyoxyalkylene to isocyanate terminals of a polyoxyalkylene segment-containing polyisocyanate compound;

(ii) the polyisocyanate compound is a polyoxyalkylene segment-containing polyisocyanate compound.

8. An apparatus unit according to claim 7, wherein said polyisocyanate compound is the polyoxyalkylene segment-containing polyisocyanate compound.

9. An electrophotographic apparatus comprising: a photosensitive member, a latent image-forming means, a means for developing a latent image and a means for transferring a developed image to a transferreceiving means; said photosensitive member comprising an electroconductive support, an intermediate layer and a photosensitive layer disposed in this order on the support, wherein said intermediate layer comprises a reaction product of a mixture including a polyol compound (A) and a polyisocyanate compound (B) satisfying at least one of the following conditions (i) and (ii):

(i) the polyol compound (A) is a high-molecular weight polyol compound formed by an addition reaction of a polyoxyalkylene to isocyanate terminals of a polyoxyalkylene segment-containing polyisocyanate compound;

(ii) the polyisocyanate compound is a polyoxyalkylene segment-containing polyisocyanate compound.

10. An electrophotographic apparatus according to claim 9, wherein said polyisocyanate compound is the polyoxyalkylene segment-containing polyisocyanate compound.

11. A facsimile apparatus comprising: an electrophotographic apparatus equipped with an electrophotographic photosensitive member and a receiving means for receiving image data from a remote terminal; said electrophotographic photosensitive member comprising an electroconductive support, an intermediate layer and a photosensitive layer disposed in this order on the support, wherein said intermediate layer comprises a reaction product of a mixture including a polyol compound (A) and a polyisocyanate compound (B) satisfying at least one of the following conditions (i) and (ii):

(i) the polyol compound (A) is a high-molecular weight polyol compound formed by an addition reaction of a polyoxyalkylene to isocyanate terminals of a polyoxyalkylene segment-containing polyisocyanate compound;

(ii) the polyisocyanate compound is a polyoxyalkylene segment-containing polyisocyanate compound.

12. A facsimile apparatus according to claim 11, wherein said polyisocyanate compound is the polyoxyalkylene segment-containing polyisocyanate compound.

* * * * *

UNITED STATES PATENT AND TRADEMARK OFFICE

CERTIFICATE OF CORRECTION

PATENT NO. : 5,246,806

DATED : September 21, 1993

INVENTOR(S) : TAKASHI KOYAMA ET AL.

It is certified that error appears in the above-indentified patent and that said Letters Patent is hereby corrected as shown below:

AT [57] ABSTRACT

Line 10, "segmentcontaining" should read --segment containing--.

COLUMN 4

Line 38, "segmentcontaining" should read --segment-containing--.

COLUMN 7

Line 54, "electroconductive" should read --electroconductive film--.

COLUMN 8

Line 23, "liquid" should read --liquid.--.
Line 38, "vapordeposition" should read --vapor-deposition--.

UNITED STATES PATENT AND TRADEMARK OFFICE
CERTIFICATE OF CORRECTION

PATENT NO. : 5,246,806

DATED : September 21, 1993

INVENTOR(S) : TAKASHI KOYAMA ET AL.

It is certified that error appears in the above-indentified patent and that said Letters Patent is hereby corrected as shown below:

COLUMN 10

Line 22, "restoringsignal" should read --restoring-signal--.

COLUMN 12

Table 3, "Dark-port" should read --Dark-park--.

COLUMN 13

Line 14, "pigments" should read --pigment--.

COLUMN 18

Line 30, "highmolecular" should read --high-molecular--.
Line 59, "changing" should read --charging--.

UNITED STATES PATENT AND TRADEMARK OFFICE

CERTIFICATE OF CORRECTION

PATENT NO. : 5,246,806

DATED : September 21, 1993

INVENTOR(S) : TAKASHI KOYAMA ET AL.

It is certified that error appears in the above-indentified patent and that said Letters Patent is hereby corrected as shown below:

COLUMN 19

Line 16, "transferreceiving" should read --transfer-receiving--.

Signed and Sealed this

Twelfth Day of July, 1994

Attest:

BRUCE LEHMAN

Attesting Officer

*Commissioner of Patents and Trademarks*

UNITED STATES PATENT AND TRADEMARK OFFICE

CERTIFICATE OF CORRECTION

PATENT NO. : 5,246,806

DATED : September 21, 1993

INVENTOR(S) : Takashi Koyama et al

It is certified that error appears in the above-indentified patent and that said Letters Patent is hereby corrected as shown below:

On the title page, item [73] Assignee: "Cannon Kabushiki Kaisha, Tokyo, Japan" should read --Cannon Kabushiki Kaisha, Tokyo; Dai-Ichi Kogyo Seiyaku Co., Ltd., Kyoto, both of Japan--.

Signed and Sealed this

Twentieth Day of September, 1994

Attest:

Bruce Lehman

BRUCE LEHMAN

*Attesting Officer*

*Commissioner of Patents and Trademarks*